(12) United States Patent
Staas et al.

(10) Patent No.: US 6,868,169 B2
(45) Date of Patent: Mar. 15, 2005

(54) SYSTEM AND METHOD FOR GEOGRAPHICAL INDEXING OF IMAGES

(75) Inventors: David Staas, Vancouver, WA (US); John H. Oleinik, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 651 days.

(21) Appl. No.: 09/768,489

(22) Filed: Jan. 24, 2001

(65) Prior Publication Data

US 2002/0097894 A1 Jul. 25, 2002

(51) Int. Cl.$^7$ ................................................ G06K 9/00
(52) U.S. Cl. ...................... 382/113; 345/763; 345/835; 707/102; 707/104.1
(58) Field of Search ................................ 382/113, 100; 345/700, 763, 835, 836, 838, 846, 968; 707/4, 100, 104.1, 102, 200

(56) References Cited

U.S. PATENT DOCUMENTS

| | | | | |
|---|---|---|---|---|
| 5,944,769 A | * | 8/1999 | Musk et al. ................ | 701/201 |
| 5,987,380 A | * | 11/1999 | Backman et al. ........... | 701/208 |
| 6,148,090 A | * | 11/2000 | Narioka ...................... | 382/113 |
| 6,199,014 B1 | * | 3/2001 | Walker et al. .............. | 701/211 |
| 6,515,595 B1 | * | 2/2003 | Obradovich et al. ........ | 340/905 |
| 2002/0029226 A1 | * | 3/2002 | Li et al. ................... | 707/104.1 |

* cited by examiner

Primary Examiner—Samir Ahmed
Assistant Examiner—Arnand Bhatnagar

(57) ABSTRACT

A system and method are provided for organizing a number of digital images. The system and method advantageously provide a geographical context for viewing the digital images. In one embodiment, a method is provided that includes the steps of associating the number of digital images with a digital map in a computer system, and geographically indexing each of the digital images on the digital map in the computer system. To geographically index each of the digital images, the present invention further provides the steps of obtaining a set of geographical coordinates associated with each of the digital images, and identifying a position on the digital map that represents the geographical coordinates for each of the digital images. In addition, the present method may include the step of positioning an image icon on each of the positions on the digital map, thereby indicating the geographical location of the corresponding digital image.

17 Claims, 8 Drawing Sheets

SYSTEM AND METHOD FOR GEOGRAPHICAL INDEXING OF IMAGES

TECHNICAL FIELD

The present invention is generally related to the field of data storage and, more particularly, is related to a system and method for geographically indexing a number of stored images.

BACKGROUND OF THE INVENTION

Since the advent of photography, people have stored collections of photographs to store memories of days past. Typically, such photos are stored in photo albums for future viewing and preservation. In more recent times, the advent of digital photography has provided alternative storage options for photographs and other images. Now, digital images may be stored, for example, on a memory device in a computer system. The accumulation of a number of images over time may result in a significant number of stored images.

To keep track of the images, a database may be employed, for example, to index the stored images. In particular, various image parameters may be included that provide a basis for a search for a desired image. In particular, an individual or other entity may provide a description of an image so that desired images may be found for viewing among many stored. However, even with word descriptions, identifying a particular image that one wishes to view may be a bit cumbersome as the database of images grows.

In addition, a number of images are viewed, an individual inevitably suffers due to a lack of positional or geographical context. Specifically, without the actual location at which a particular image or picture was taken or the direction of the view depicted, it is difficult to appreciate how the various views relate to each other given the geography in which they were taken. For example, two different pictures may be taken from the same spot, but facing different directions. When one views both pictures, they may get the false impression that the images or pictures were taken at two entirely different locations. The sense would be that the area was much larger than its actual size and that the features in the views depicted were farther apart or are unrelated in terms of proximity.

SUMMARY OF THE INVENTION

In light of the foregoing, a system and method are provided for organizing a number of digital images. The present invention advantageously provides a geographical context for viewing the digital images. In this respect, the method provides for the steps of associating the number of digital images with a digital map in a computer system, and geographically indexing each of the digital images on the digital map in the computer system. To geographically index each of the digital images, the present invention further provides the steps of obtaining a set of geographical coordinates associated with each of the digital images, and identifying a position on the digital map that represents the geographical coordinates for each of the digital images. In addition, the present method may include the step of positioning an image icon on each of the positions on the digital map, thereby indicating the geographical location of the corresponding digital image.

According to another embodiment of the present invention, a system in a server is provided for organizing a number of digital images. In this regard, the present system comprises, for example, a processor circuit having a processor and a memory and an indexing system stored on the memory and executable by the processor. The indexing system includes logic to associate the number of digital images with a digital map, and logic to geographically index each of the digital images on the digital map. The indexing system further includes, for example, logic to obtain a set of geographical coordinates associated with each of the digital images, and logic to identify a position on the digital map that represents the geographical coordinates for each of the digital images. In addition, the indexing system includes logic to position an image icon on each of the positions on the digital map, thereby indicating the geographical location of the corresponding image.

In addition, the present invention provides for a second method for indexing a number of digital images. The second method comprising the steps of displaying a digital map of a geographical area on a display device of a computer system, displaying an image icon generated by an indexing system on the digital map, the image icon being associated with a digital image accessible by the computer system, and, displaying the digital image upon a manipulation of the image icon.

The system and methods of the present invention provide a distinct advantage in that digital images are indexed according to geographical location, thereby providing an individual with a geographical context of the views within each digital image. In addition, images are organized in a manner that makes it very easy to find and access a desired digital image for viewing.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
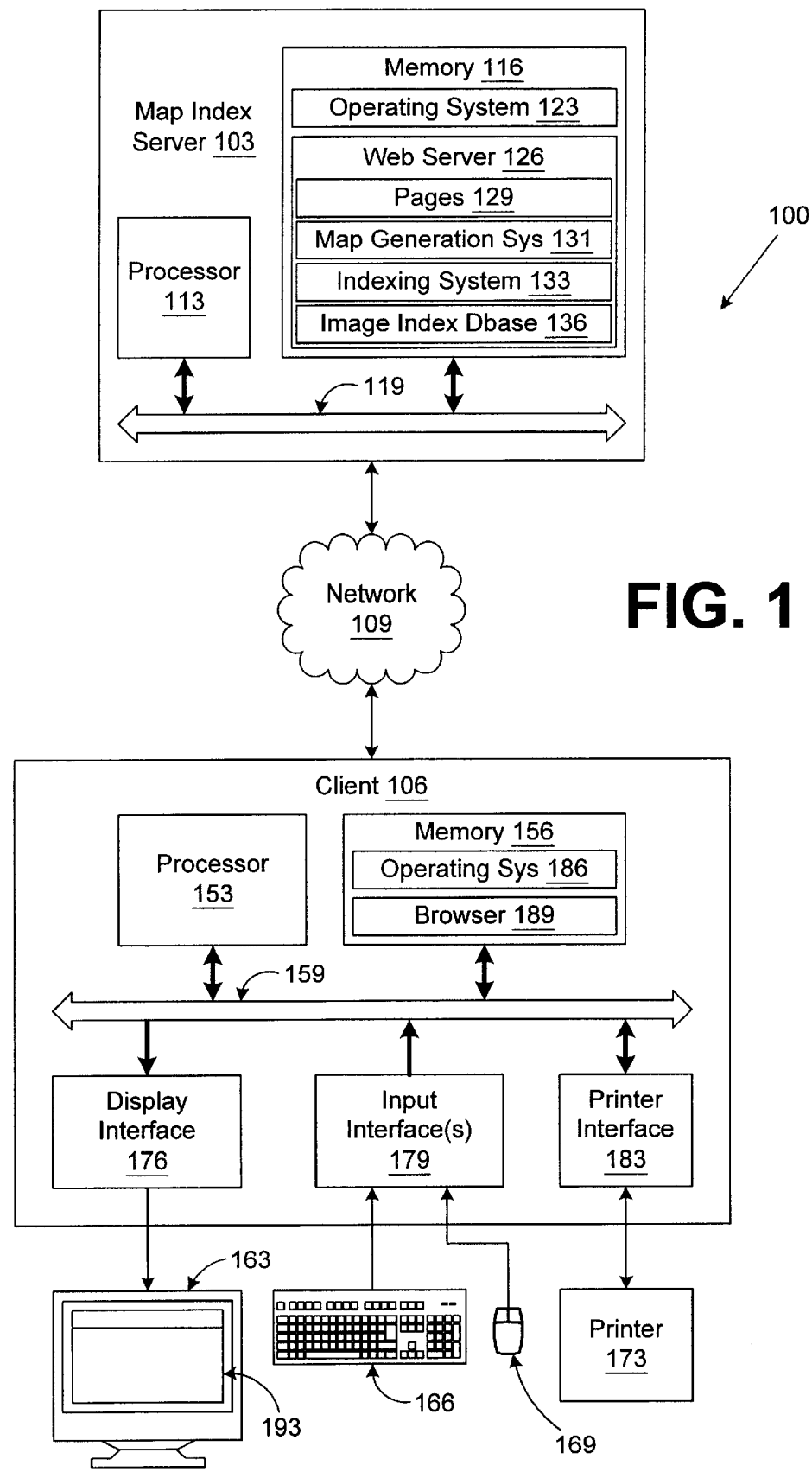
FIG. 1 is a block diagram of a network that employs an image indexing system according to an embodiment of the present invention.

With reference to FIG. 1, shown is a client/server arrangement 100 that is employed to geographically index a number of digital images according to an aspect of the present invention. The client/server arrangement 100 includes a map index server 103 and a client 106, both of which are coupled to a network 109. The map index server 103 and the client 106 may comprise, for example, computer systems or other device with suitable capability to perform the functionality as discussed herein. Map index server 103 includes a processor 113 and a memory 116, both of which are coupled to a local interface 119. The local interface 119 may be, for example, a data bus with an accompanying control bus as is generally understood by those with ordinary skill in the art.

Stored on the memory 116 and executable by the processor 113 are an operating system 123 and a web server 126. The web server 126 includes a map generation system 131, an indexing system 133, and an image index database 136. Alternatively, the map generation system 131 may be stored and executed in a separate server coupled to the network 109. The operation of the operating system 123 is generally known to those with ordinary skill in the art and, consequently, is not discussed herein in detail. The operation of the web server 126 and the components contained therein will be discussed in the text that follows. The web server 126 is actually representative of the various types of servers that may be employed according to the principles of the present invention. Therefore, the present invention may be accomplished using other servers that operate according to protocols other than that employed on the World Wide Web.

The client 106 includes a processor 153 and a memory 156, both of which are coupled to a local interface 159. The local interface 159 may comprise, for example, a data bus with an accompanying control bus as is generally known by those with ordinary skill in the art. The client 106 also includes one or more peripheral devices such as, for example, a display device 163, a keyboard 166, a mouse 169, and/or a printer 173. The client 106 also includes a display interface 176, one or more input interfaces 179, and a printer interface 183. The display interface 176 couples the display device 163 to the local interface 159. The display device 163 may be, for example, a cathode ray tube (CRT), a liquid crystal display screen, a gas plasma-based flat panel display, indicator lights, light emitting diodes, or other suitable display device.

Similarly, the keyboard 166, mouse 169, and printer 173 are coupled to the local interface 159, for example, through the input interfaces 179 and the printer interface 183, respectively. The display interface 176, input interfaces 179, and printer interface 183 may comprise, for example, various interface cards or other such devices that couple the respective devices to the local interface 159 to enable data communication between the processor 153 and the respective input/output device. Note that other interfaces may be employed to a couple various peripheral devices to the local interface 159 as is generally known by those with ordinary skill in the art. Such other peripheral devices that may be employed with the client 106 include, for example, a keypad, touch pad, touch screen, microphone, scanner, joystick, or one or more push buttons, indicator lights, speakers, etc.

Stored on the memory 156 and executable by the processor 153 are an operating system 186 and a browser 189. The operating system 186 is executable by the processor 153 to control basic operation of the client 106 as is generally known by those with ordinary skill in the art. Also the browser 189 is executable by the processor 153, for example, to provide access to the web server 126 or other type of server stored on the map index server 103. The browser 189 may also provide access to other servers on the network 109 as is generally known by those with ordinary skill in the art. When executed, the browser 189 displays a graphical user interface 193 on the display device 163 that is manipulated to view various pages of sites stored on various web servers coupled to the network 109 as is generally understood by those with ordinary skill in the art. For example, the browser 189 may be employed to access pages stored in the web server 126 as will be discussed.

Next a general discussion is provided of the geographical indexing of a number of images on a digital map as accomplished in the client/server arrangement 100 according to an aspect of the present invention. To begin, a user manipulates the browser 189 to access various pages on the web server 126. Specifically, the browser 189 generates a request for the desired page 129. In response, the web server 126 transmits the various images and graphical user interface components that are associated with the requested page 129. In doing so, the web server 126 may employ the map generation system 131 and the indexing system 133 to generate various images and components for display with the requested page 129. For example, one of the images to be generated and displayed on the display device 163 as requested for a particular page 129 is a digital map that is generated by the map generation system 129. The indexing system 133 generates a number of icons that are then located on the digital map by the browser 189.

Upon manipulating each of the icons, a digital image that is stored in the image index database 136 is displayed on the display device 163 as will be discussed. In this manner, a number of digital images stored in the image index database 136 may be indexed according to a location on the digital map, i.e. geographical indexing. The indexing system 133 also provides various graphical user interface components that allow a user to perform various functions with regard to the geographical indexing of the digital images on the digital map as will be described.

The network 109 includes, for example, the Internet, wide area networks (WANs), local area networks, or other suitable networks, etc., or any combination of two or more such networks. The map index server 103 and the client 106 are each coupled to the network 109 to facilitate data communication to and from the network 109 in any one of a number of ways that are generally known by those of ordinary skill in the art. For example, the map index server 103 and the client 106 may be linked to the network 109 through various devices such as, for example, network cards, modems, or other such communications devices.

In addition, the memories 116 and 156 may include both volatile and nonvolatile memory components. Volatile components are those that do not retain data values upon loss of power. Nonvolatile components are those that retain data upon a loss of power. Thus, each of the memories 116 and 156 may comprise, for example, random access memory (RAM), read-only memory (ROM), hard disk drives, floppy disks accessed via an associated floppy disk drive, compact disks accessed via a compact disk drive, magnetic tapes accessed via an appropriate tape drive, and/or other memory components, or a combination of any two or more of these memory components.

Also, the processors 113 and 153 each may represent multiple processors and the memories 116 and 156 each may represent multiple memories that operate in parallel. In such a case, the local interfaces 119 and 159 each may be an appropriate network that facilitates communication between any two of the multiple processors or between any processor and any of the memories, etc. The local interfaces 119 and 159 each may facilitate memory to memory communication as well. The processors 113/153, memories 116/156, and local interfaces 119/159 may be electrical or optical in nature. Also, the memories 116/156 may be magnetic in nature.

Figure 2:
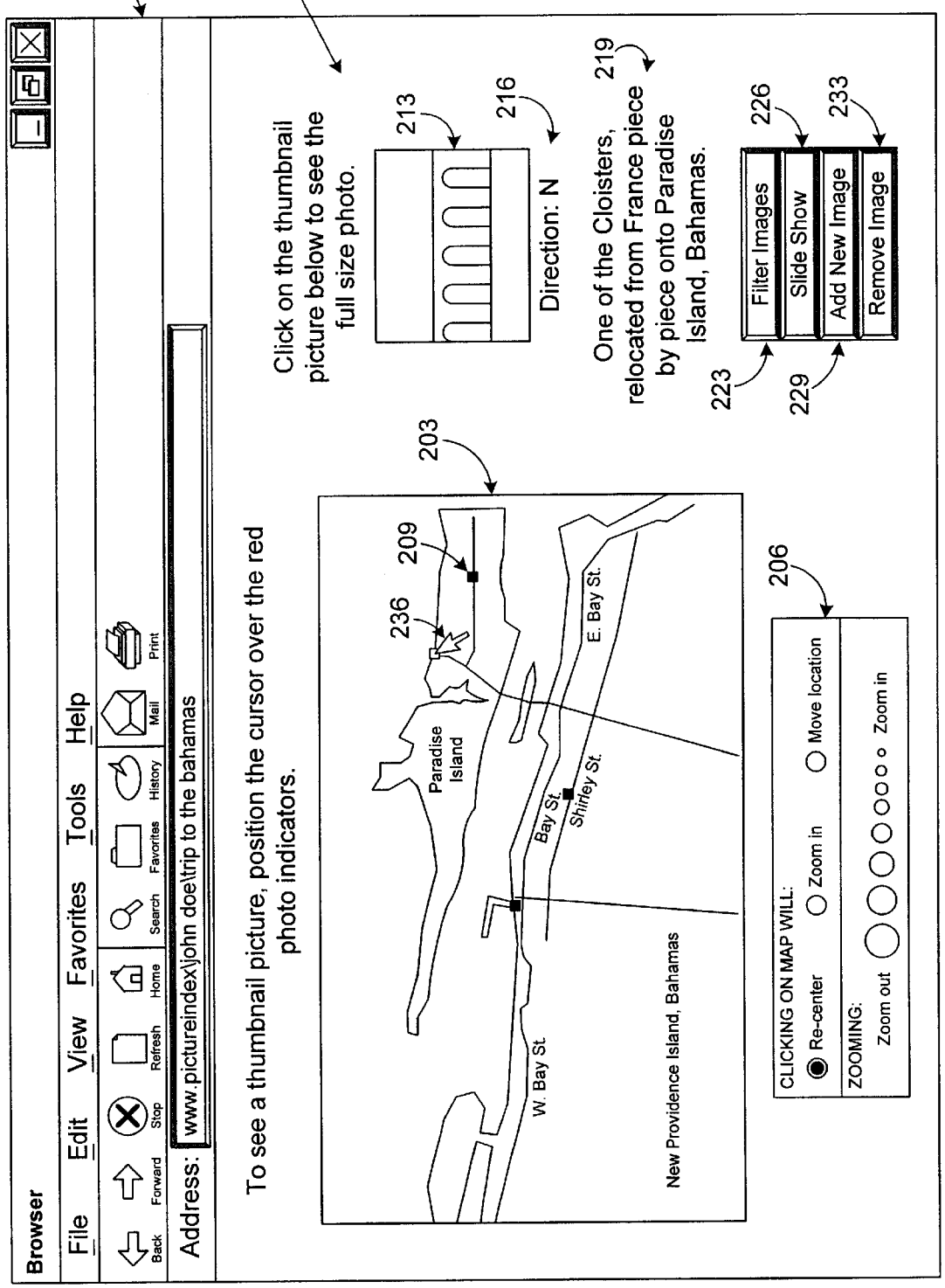
FIG. 2 is a drawings of an image indexing interface generated by the image indexing system of FIG. 1 according to an aspect of the present invention.

With reference to FIG. 2, shown is a graphical user interface 193a that is displayed on the display device 163 (FIG. 1) by the browser 189 (FIG. 1). The graphical user interface 193a displays a first page 129a that includes a digital map 203 with a map control interface 206. The map control interface 206 provides the ability to manipulate the view of the digital map 203 to focus on a different area or to zoom in on a particular location as is generally known by those with ordinary skill in the art. The map control interface 206 is representative of other various map control interfaces that may be included according to the principles of the present invention.

A number of image icons 209 are positioned on the digital map 203. The graphical user interface 193a also includes a digital image 213 with an associated direction indication 216 and an associated caption 219. The digital image 213 is associated with one of the image icons 209. The direction indication 216 indicates a direction in terms of North, South, East or West, for example, etc., of the view depicted in the digital image 213. Note that the direction indication 216 may also provide the directional information in terms of degrees or other indication. For example, the direction indication 216 indicates a direction in which a camera was pointed upon taking the picture that resulted in the digital image 213. The caption 219 is associated with the digital image 213 and may be entered by the user. For example, the caption 219 may describe the subject matter of the digital image 213. The graphical user interface 193a also includes a "Filter images" button 223, a "slide show" button 226, and a "add new picture" button 229, and a "remove picture" button 233, the function of which is described in the following text.

Next, a discussion is provided of how the digital map 203 provides for the geographical indexing of one or more digital images 213. To begin, the digital map 203 is generated on the graphical user interface 193a when the first page 129a is accessed from the web server 126 (FIG. 1) by the browser 189 (FIG. 1) as is generally understood by those with ordinary skill in the art. The user may alter the geographical area depicted in the digital map 203 by manipulating the map control interface 206. The manipulation of map control interfaces 206 to display a particular digital map 203 is generally understood by those skilled in the art and not discussed herein in detail. For example, to manipulate a particular button or other component, the user may position the cursor thereon using, for example, the mouse 169 and press the button of the mouse 169. This is often referred to as "clicking" on a particular component as is generally understood by those with ordinary skill in the art.

A number of image icons 209 are displayed at predetermined positions on the digital map 203. A user may highlight one of the image icons 209, for example, by placing a cursor 236 over the respective image icon 209. In response, the image icon 209 may change to a different color to indicate that it has been selected by the user. Note that the cursor 236 may be moved around the digital map 203 and the graphical user interface 193a by manipulating the mouse 179 (FIG. 1) as is generally known by those with ordinary skill in the art. When one of the image icons 209 is highlighted having been pointed to by the cursor 236, the digital image 213 that is associated with the selected image icon 209 is shown. Likewise, the directional indication 216 and the caption 219 that are associated with particular the digital image 213 are displayed. The digital image 213 may be, for example, a picture that was taken at the location at which the respective image icon 209 is placed.

Note that the digital image 213 as shown in FIG. 2 is in thumbnail size. To obtain the desired thumbnail view, when an image icon 209 is selected by manipulation of the cursor 236 as above, a request is transmitted to the web server 126 (FIG. 1) to download the thumbnail view of the associated digital image 213 stored in the image index database 136 (FIG. 1). In response, the web server 126 obtains the thumbnail view of the associated digital image 213 from the image index database 136 and transmits it to the client 106 for display. Alternatively, all of the thumbnail views of the digital images 213 with associated image icons 209 displayed on the digital map 203 may be downloaded to the client 106 and stored on the memory 156 when the user first accesses the first page 129a.

Note that the image icons 209 that are displayed on the digital map 203 are depicted since they fall within the geographical region that is displayed in the digital map 203. That is to say, if the digital map 203 focuses on a different geographical area, different icons 209 may be displayed that are associated with different digital images 213 that are associated with geographical coordinates within the new geographical area depicted in the digital map 203.

In addition, according to an aspect of the present invention, the digital images 213 that are geographically indexed on the digital map 203 by positioning respective image icons 209 may be limited to a select few based upon a predetermined criteria or filter. In order to create the particular filter or criteria by which the digital images 213 are indexed on the digital map 203, the user may click on the filter images button 223. To view a number of digital images 213 in full size in a slide show format, a user may click on the slide show button 226. Further, if a user wishes to index a new digital image 213 on the digital map 203, then the user may click on the add new picture button 229. This causes an appropriate user interface to appear that facilitates the geographical indexing of an additional digital image 213 by placing a new image icon 209 on the digital map 203 that is associated with the new digital image 213. Finally, given that a user has highlighted one of the image icons 209 associated with a particular digital image 213, a user may remove the geographical indexing of the digital image 213 by clicking on the remove picture button 233. Assuming that a user has clicked on the remove picture button 233, for example, the highlighted image icon 209 is removed from the digital map 203 and the corresponding digital image 213 is also removed from the image index database 136.

Figure 3:
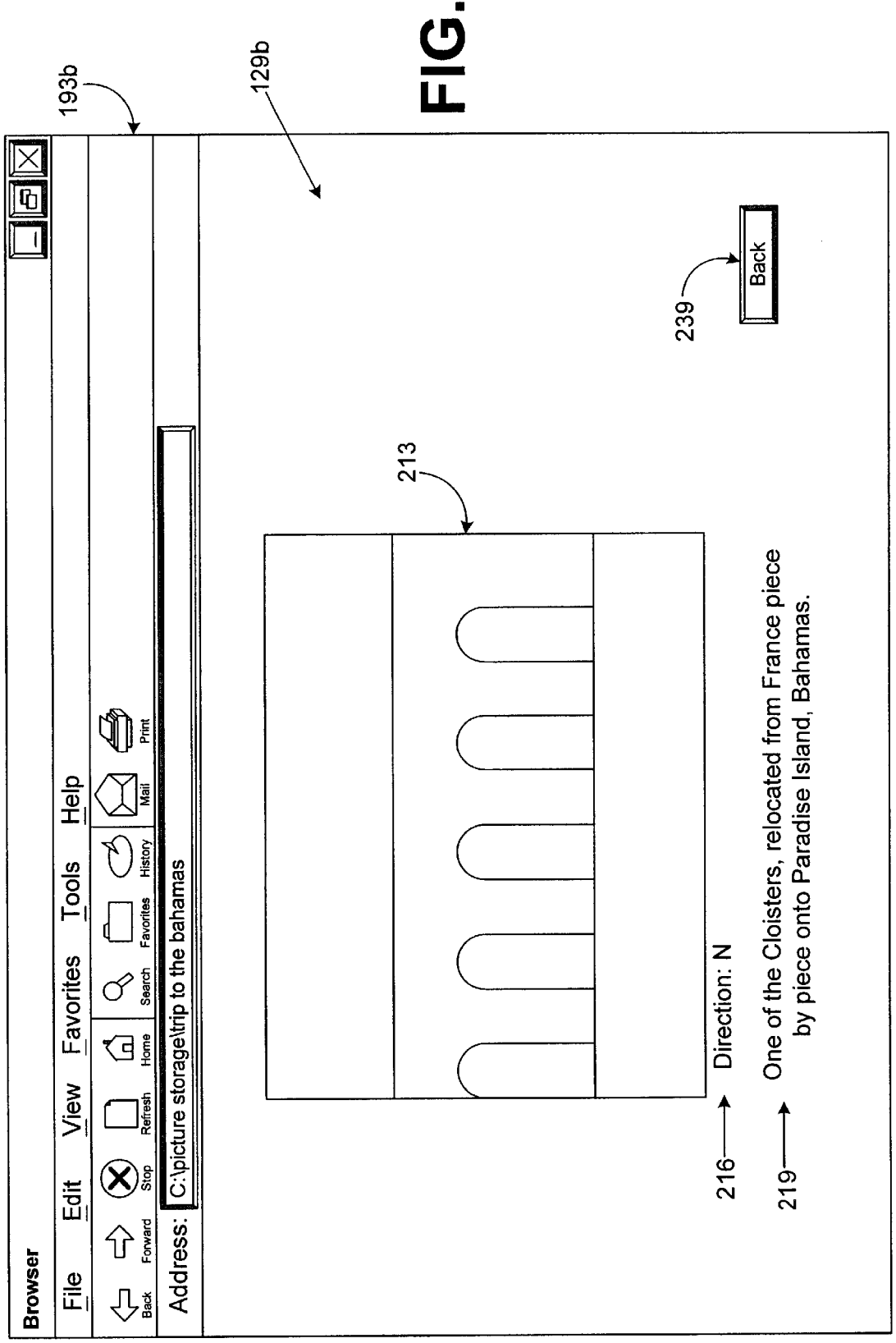
FIG. 3 is a drawing of an image viewing interface generated by the image indexing system of FIG. 1 according to an aspect of the present invention.

With reference to FIG. 3, shown is a second graphical user interface 193b that depicts a second page 129b from the web server 126 (FIG. 1). The second page 129b is generated by clicking on the thumbnail view of the digital image 213 as depicted with respect to FIG. 2. In such a case the digital image 213 is depicted in full size with the direction indication 216 and the caption 219 displayed thereunder. Specifically, when the user clicks on the thumbnail view of the digital image 213, the client 106 transmits a request to the web server 126 (FIG. 1) for the full size view of the digital image 213. In response, the web server 126 obtains the full size view of the digital image 213 from the image index database 136 (FIG. 1) and transmits it to the client 106 for display in the second graphical user interface 193b. Note that other information associated with the digital image 213 beyond the direction indication 216 and the caption 219, if any, may be displayed as well. Such other information may include, a value ranking the importance of a particular image among all that are indexed, a date associated with an image, or other information. To go back to the first page 129a (FIG. 2), the user may click on the back button 239.

Figure 4:
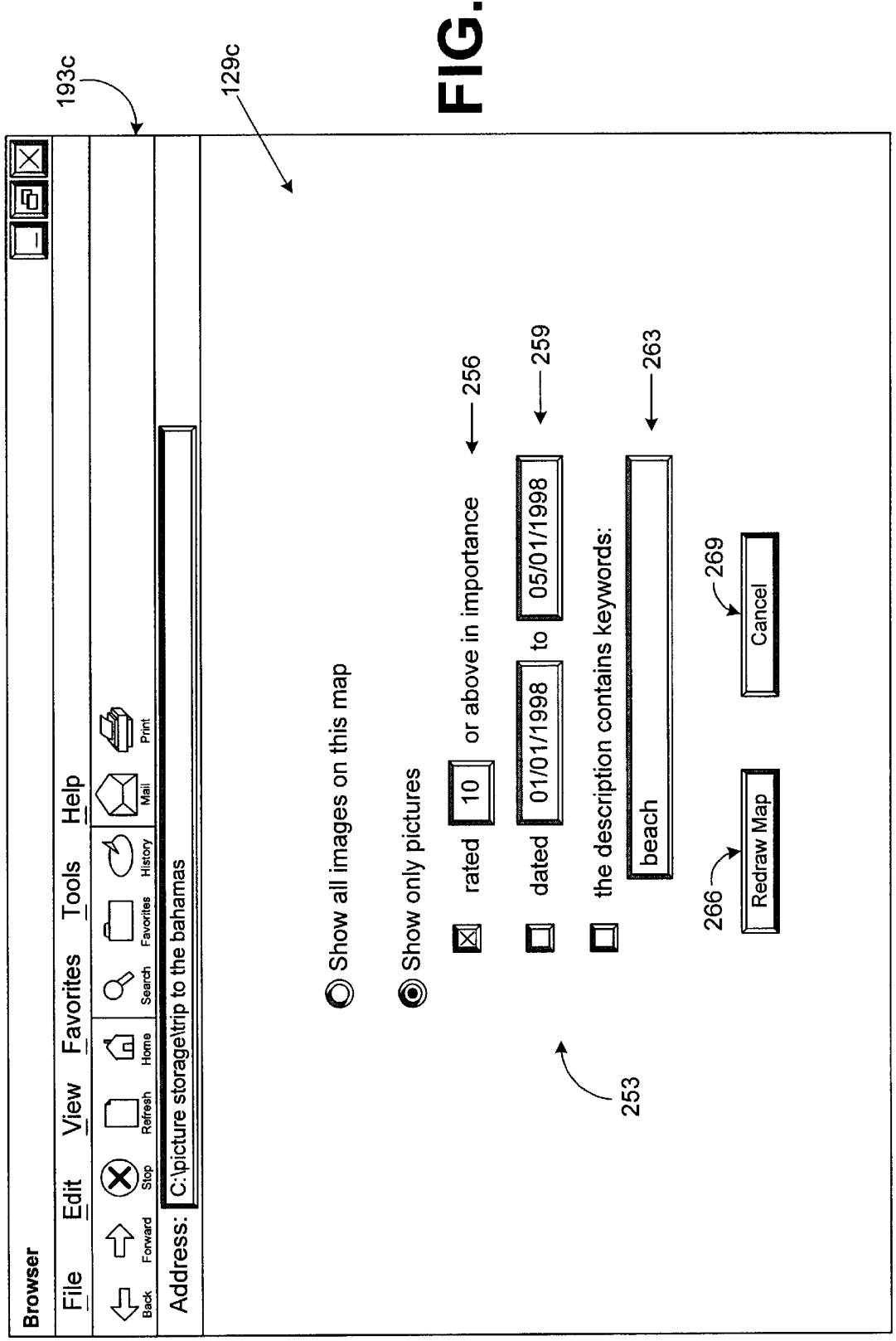
FIG. 4 is a drawing of an image filter interface generated by the image indexing system of FIG. 1 according to an aspect of the present invention.

Turning then to FIG. 4, shown is a third graphical user interface 193c that includes a third page 129c that is generated by the web server 126 (FIG. 1). The third page 129c is generated when the user clicks upon the filter images button 223 (FIG. 2) with the desire of setting criteria used to determine which digital images 213 (FIG. 2) are to be geographically indexed on the digital map 203 (FIG. 2). As shown, the user may toggle between representing all digital images 213 or to select digital images 213 based upon a predetermined criteria 253. The predetermined criteria 253 may comprise, for example, a digital image rank 256 that is associated with each digital image 213, a date range 259, or description key words 263. The description key words 263 may be used, for example, to search the captions 219 (FIG. 2) associated with each of the digital images 213. Note that other criteria may be employed as well.

Once a user has selected the predetermined criteria 253, the user may click on the redraw map button 266. The browser 189 (FIG. 1) then transmits a message to the web server 126 to regenerate the digital map 203 with the image icons 209 (FIG. 2) that are associated with digital images 213 that fall within the predetermined criteria 253. Otherwise, the user may click on the cancel button 269 to go back to the first page 129a where upon the digital map 203, image icons 209, digital image 203 (FIG. 2), and other components are displayed according to the preexisting criteria. When the first page 129a is first accessed, default criteria are included to filter the digital images 213 that are displayed on the digital map 203. The default criteria may be, for example, the "show all images on this map" selection to represent all of the digital images 213 with a corresponding image icon 209.

Figure 5:
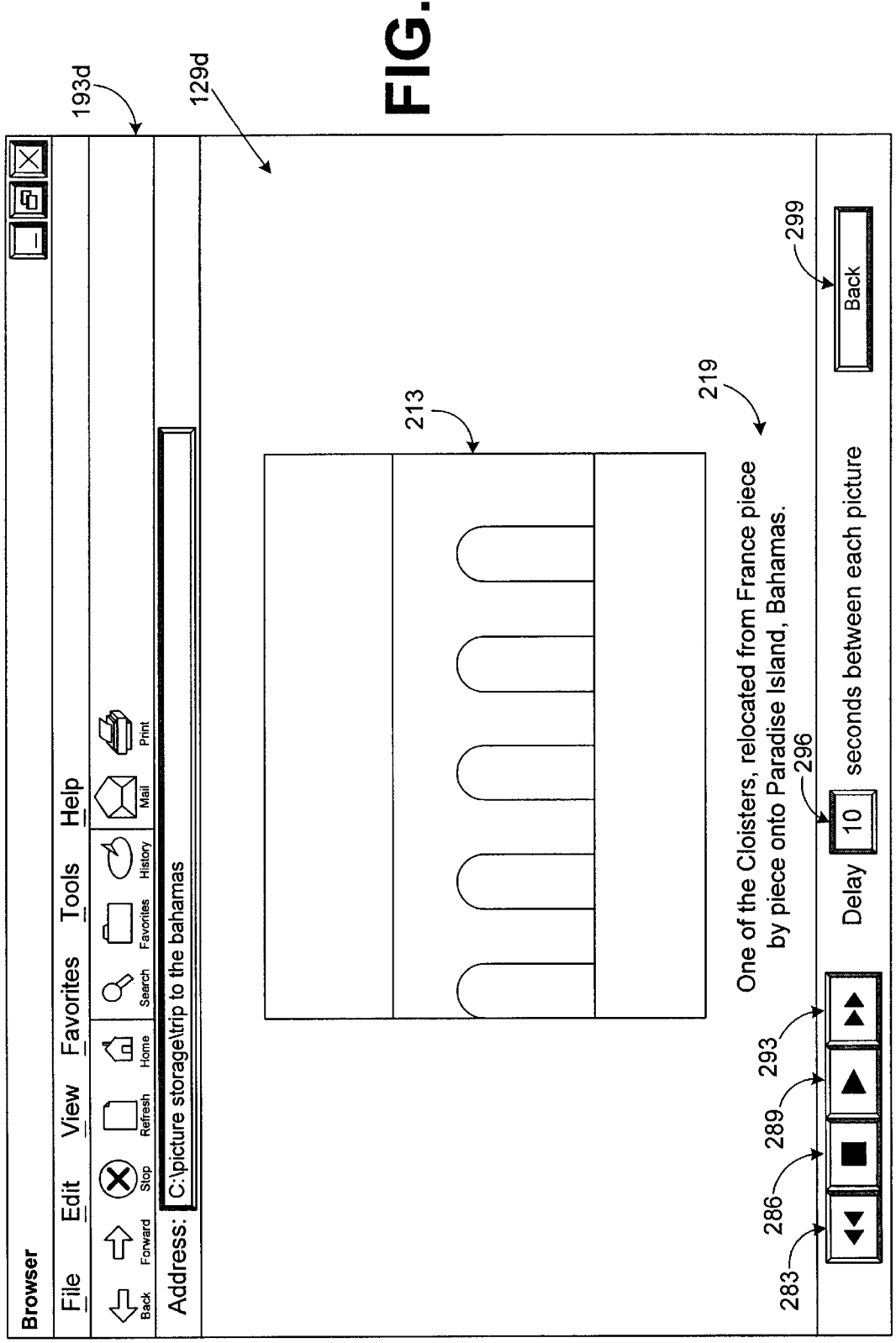
FIG. 5 is a drawing of a slide show interface generated by the image indexing system of FIG. 1 according to an aspect of the present invention.

With reference to FIG. 5, shown is a fourth graphical user interface 193d that depicts a fourth page 129d that is served by the web server 126 (FIG. 1). The fourth page 129d is served to the client 106 (FIG. 1) in response to a message received from the client 106 when the user clicks on the slide show button 226 (FIG. 2) on the first page 129a (FIG. 2). The fourth page 129d includes a digital image 213 and the associated caption 219. The fourth page 129d might also display the direction indication 216 (FIG. 2) and any other information associated with the digital image 213.

The fourth page 129d also includes slide show controls such as, for example, a reverse button 283, a stop button 286, a play button 289, and a fast forward button 293. The fourth page 129d also includes a time delay 296 and a "back" button 299. By pressing the play button 289, a number of digital images 213 are displayed one at a time for a period of time equaling the time delay 296. To stop the progressive display of the digital images 213, the user may click on the stop button 286. To go back and display digital images 213 that had previously been displayed in reverse order, the user may click on the reverse button 283. To move on to the next digital image 213 before the time delay 196 has tolled, the user may click on the fast forward button 293. If a user wishes to go back to the first page 129a (FIG. 2), then the user may click on the back button 299. Thus, the fourth page 129d provides a means of displaying all of the digital images 213 associated with the digital map 203 (FIG. 2) based upon the predetermined criteria 253 (FIG. 4). Those digital images 213 that do not fall within the predetermined criteria 253 (FIG. 4) are not displayed.

Figure 6:
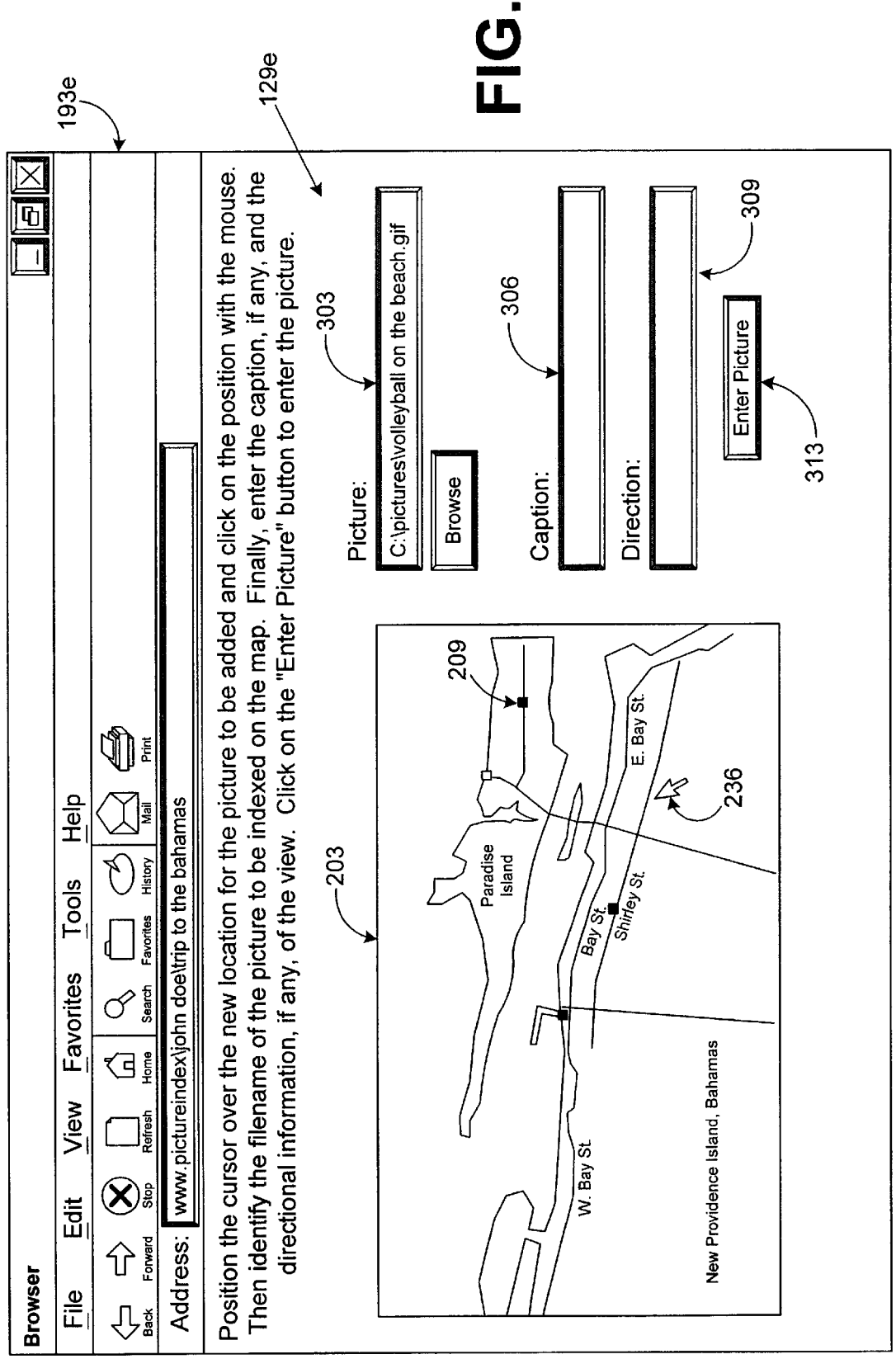
FIG. 6 is a drawing of an image addition interface generated by the image indexing system of FIG. 1 according to an aspect of the present invention.

With reference to FIG. 6, shown is a fifth graphical user interface 193e that includes a fifth page 129e according to an aspect of the present invention. The fifth page 129e is employed to allow a user to index a new digital image 213 (FIG. 2) on the digital map 203. The fifth page 129e is served to the client 106 (FIG. 1) in response to a request generated by the client 106 when the user clicks on the "add new image" button 229 (FIG. 2) from the first page 129a (FIG. 2). The fifth page 129e includes the digital map 203, a picture field 303, a caption field 306, a direction field 309 and an "enter image" button 313.

When the fifth page 129e is displayed, the user may position the cursor 236 at a location on the digital map 203 that corresponds with the geographical location associated with the digital image 213 to be added. By clicking on the position, the geographical coordinates that correspond to the position are selected. Alternatively, the digital image 213 to be added may include the desired geographical coordinates as part of the image file. In such a case, the geographical coordinates may be automatically detected in the image file, thereby eliminating the need for a user to enter the same. Next, the user is required to identify the digital image 213 by virtue of its file name and storage location with the picture field 303. Specifically, the user may enter in the filename and storage location in the picture field or may click on the browse button thereunder to allow the user to choose from the various digital images stored, for example, in the memory 156 (FIG. 1). The user then may enter the caption 219 (FIG. 2) and the direction indication 216 (FIG. 2) in the caption and direction fields 306 and 309, respectively. Thereafter, the user may click on the enter picture button 313 and the digital image 213 is downloaded from the client 106 to the web server 126 (FIG. 1) where it is stored in the image index database 136 (FIG. 1). Thereafter, an image icon 209 is displayed on the digital map 203 at the identified location that is associated with the newly added digital image 213.

Figure 7:
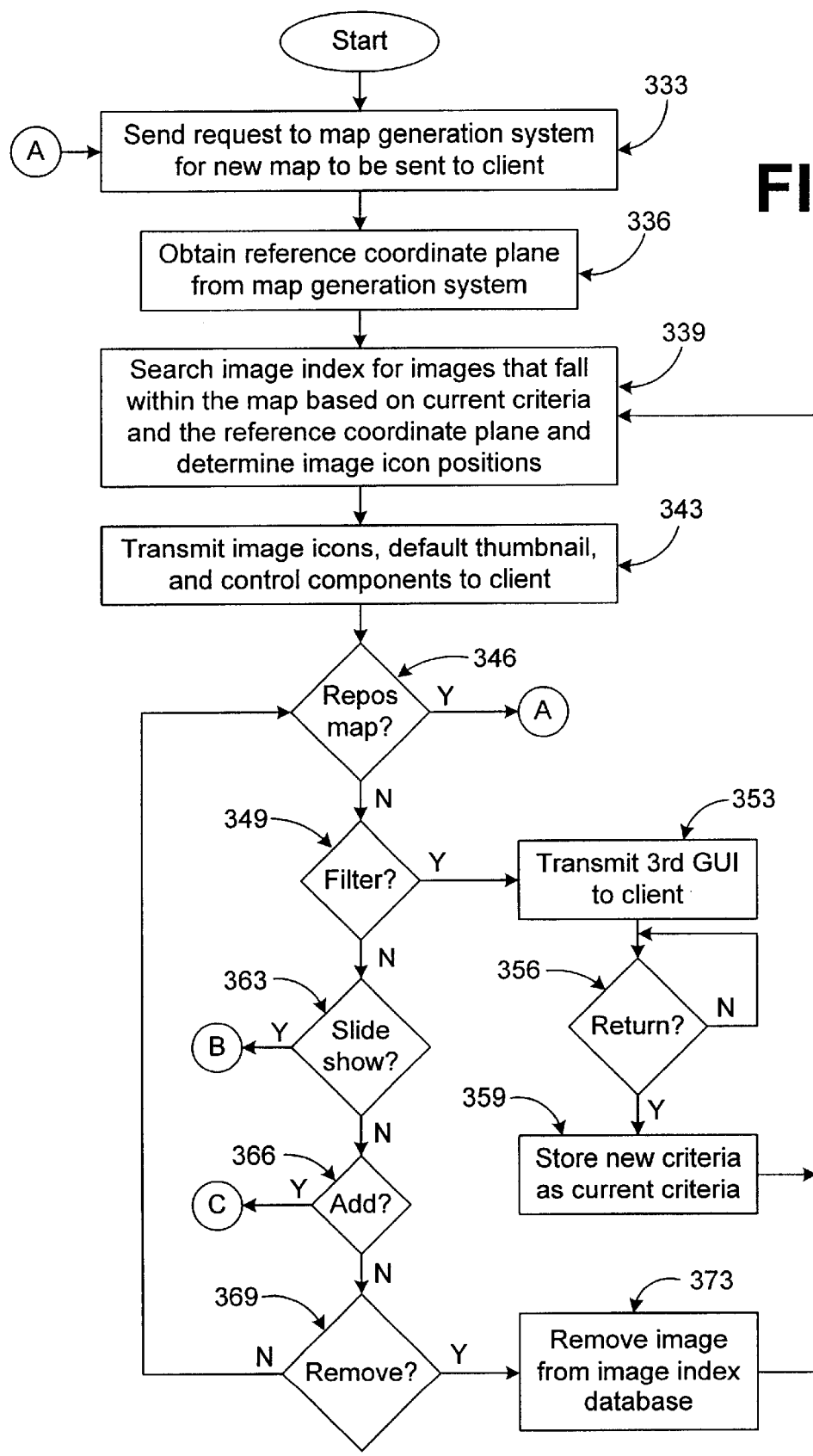
FIG. 7 is a flow chart further depicting an image indexing system of FIG. 1.

Turning to FIG. 7, shown is a flowchart of the indexing system 133 according to an embodiment of the present invention. Alternatively, the flow chart of FIG. 7 may be viewed as a method executed in the map index server 103 (FIG. 1). The indexing system 133 is executed by the processor 113 (FIG. 1) to geographically index the digital images 213 (FIG. 2) stored in the image index database 136 (FIG. 1) onto the digital map 203 (FIG. 2) that is generated by the map generation system 131 (FIG. 1). The indexing system 133 is executed as needed in conjunction with the activity of the web server 126 (FIG. 1) in responding to the requests from the client 106 (FIG. 1).

Beginning with block 333, the indexing system 133 requests a new digital map 203 from the map generation system 131 to be transmitted to the client 106 in response to a request by the client 106 for the first page 129a (FIG. 2). Thereafter, in block 336 a map coordinate plane is obtained from the map generation system 131. The map coordinate plane identifies a coordinate system that is associated with a digital map 203 that may be, for example, the geographical coordinates according to global longitude and latitude or other coordinate system. Thus, in block 336 the indexing system 133 obtains a reference coordinate plane by which the image icons 209 (FIG. 2) may be positioned on the digital map 203 (FIG. 2).

Then, in block 339, the image index database 136 is searched for all digital images 213 that include geographical coordinates that fall on the digital map 203 obtained from the map generation system 131. These digital images 213 are obtained based upon whether they fall within the digital map 203 as determined from the reference coordinate plane and upon the current criteria 253 (FIG. 4). For each digital image that falls within the digital map 203, a position of an associated image icon 209 is determined on the digital map 203 that corresponds with the geographical coordinates of the digital image 213. In particular, the geographical coordinates of the digital image 213 is cross referenced onto the reference coordinate plane and the position on the digital map 203 is determined therefrom.

Thereafter, in block 343, the image icons 209 (FIG. 2), a thumbnail view of a default on of the digital images 213, and the various buttons 223, 226, 229, and 233 (FIG. 2) are transmitted to the client 106 as requested by the browser 189 for display on the display device 163 as the first page 129*a*. Note that the digital map 203 may be transmitted separately by the map generation system 131. The first page 129*a* is displayed by the browser 189 on the display device 163.

Next, the indexing system 133 determines whether the digital map 203 (FIG. 2) is to be repositioned based upon a request for a different digital map based upon the manipulation of the map control interface 206 (FIG. 2) by the user of the client 106 (FIG. 1). Specifically, when the user manipulates the map control interface 206 to focus on a different area, zoom in, or zoom out, etc., a request is generated by the client 106, for example, that is transmitted to the web server 126 for a digital map 203 that covers the new desired geographical area. If such is the case then the indexing system 133 reverts back to block 333 where a new digital map 203 is generated and the process is begun once again. Otherwise, the indexing system 133 moves to block 349.

In block 349, the indexing system 203 determines whether the filter that is applied to determine which of the digital images 213 are geographically indexed is to be altered. This situation occurs, for example, when the user clicks on the "filter images" button 223 and a request for the third page 129*c* is transmitted to the web server 126 by the client 106. In response, in block 353 the third page 129*c* is transmitted to the client 106 to allow the user to alter the criteria 253 (FIG. 4) as discussed above. Then in block 356, the indexing system 133 waits to receive the new criteria 253. In block 359 the new criteria 253 is stored as the current criteria to be employed in filtering the digital images 213. Thereafter, the indexing system 133 reverts to block 339 to generate the new digital map and identify the respective image icons 209 that are displayed by the client 106.

Referring back to block 349, assuming that the filter is not to be changed, the indexing system 133 moves to block 363 to determine whether a slide show of the digital images 213 is to be presented without geographical indexing. This is determined, for example, when a request is received from the client 106 generated in response to the user clicking on the slide show button 226. If the slide show is to be performed, then the indexing system 133 moves to connector B. Otherwise, the indexing system 133 moves on to block 366 as shown.

In block 366, the indexing system 133 determines whether a new digital image 213 is to be geographically indexed on the digital map 203. This is determined, for example, by the receipt of a message generated by the client 106 in response to a user clicking on the "add new image" button 229. If such is the case then the indexing system 133 moves to connector C. Otherwise, the indexing system 133 proceeds to block 369.

In block 369, the indexing system 133 determines whether a digital image 213 geographically indexed on the digital map 203 is to be removed. This is determined, for example, by the receipt of a message generated by the client 106 in response to a user clicking on the "remove image" button 233. If such is the case then the indexing system 133 moves to block 373. Otherwise, the indexing system 133 reverts back to block 346. In block 373, the digital image 213 is removed from the image index database 136. Thereafter, the indexing system 133 reverts back to block 339 to generate the digital map 203 depicted previously minus the image icon 209 associated with the deleted digital image 213.

Figure 8:
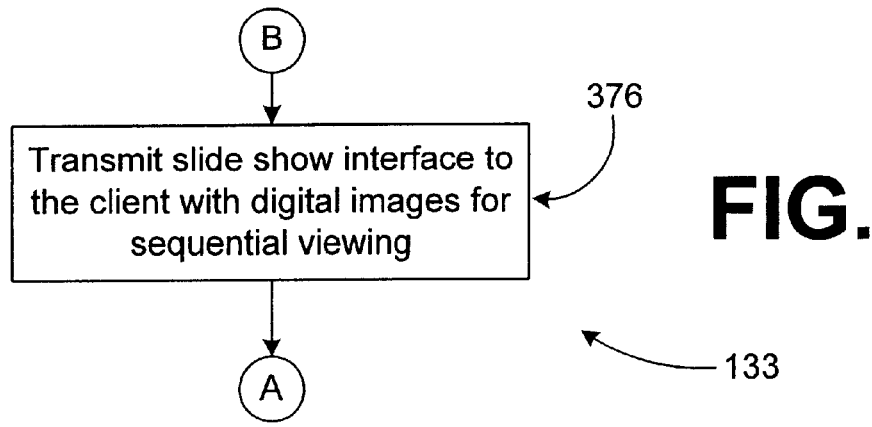
FIG. 8 is a flow chart further depicting an image indexing system of FIG. 1.

Referring then, to FIG. 8, shown is a flow chart that further illustrates the indexing system 133. From block 363 (FIG. 7), the indexing system 133 proceeds to block 376 in which the fourth page 129*d* is transmitted to the client 106 with the digital images 213 for viewing in sequential format as discussed with reference to FIG. 5. When finished as indicated by the user clicking on the back button 299 (FIG. 5), the indexing system 133 reverts back to block 333 (FIG. 7).

Figure 9:
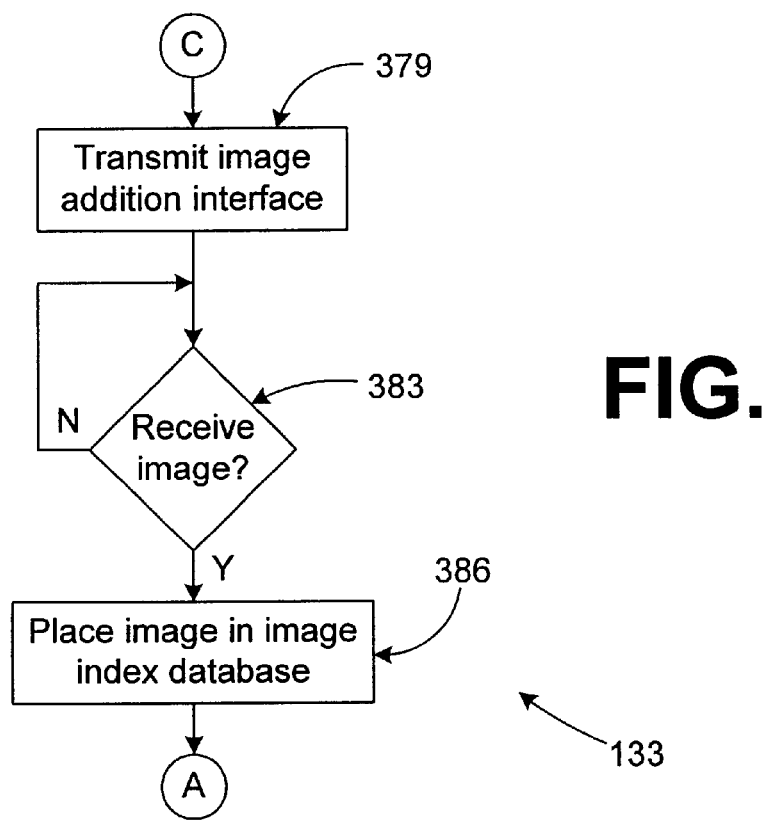
FIG. 9 is a flow chart further depicting an image indexing system of FIG. 1.

With reference to FIG. 9, shown is another flow chart that further illustrates the indexing system 133. From block 366 (FIG. 7), the indexing system 133 proceeds to block 379 in which the fifth page 129*e* (FIG. 6) is transmitted to the client 106 to enable a user to add a new digital image 213 (FIG. 2) to the image index database 136 for geographical indexing. Thereafter, the indexing logic 133 moves to block 383 to wait for the new digital image 213 to be received from the client 106 along with the associated direction indication 216, caption 219, date, and any other information. Then, the indexing system 133 moves to block 386 in which the digital image 213 and the associated information is stored in the image index database 136 (FIG. 1). The indexing system 133 then reverts back to block 333 (FIG. 7).

Although the indexing system 133 (FIG. 1) of the present invention is embodied in software executed by general purpose hardware as discussed above, as an alternative the indexing system 133 may also be embodied in dedicated hardware or a combination of software/general purpose hardware and dedicated hardware. If embodied in dedicated hardware, the indexing system 133 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 7–9 show the architecture, functionality, and operation of an implementation of the indexing system 133. If embodied in software, each block may represent a module, segment, or portion of code that comprises one or more executable instructions to implement the specified logical function(s). If embodied in hardware, each block may represent a circuit or a number of interconnected circuits to implement the specified logical function(s). Although the flow charts of FIGS. 7–9 show a specific order of execution, it is understood that the order of execution may differ from that which is depicted. For example, the order of execution of two or more blocks may be scrambled relative to the order shown. Also, two or more blocks shown in succession in FIGS. 7–9 may be executed concurrently or with partial concurrence. It is understood that all such variations are within the scope of the present invention. Also, the charts of FIGS. 7–9 are relatively self-explanatory and are understood by those with ordinary skill in the art to the extent that software and/or hardware can be created by one with ordinary skill in the art to carry out the various logical functions as described herein.

Also, the indexing system 133 can be embodied in any computer-readable medium for use by or in connection with an instruction execution system such as a computer/processor based system or other system that can fetch or obtain the logic from the computer-readable medium and execute the instructions contained therein. In the context of this document, a "computer-readable medium" can be any medium that can contain, store, or maintain the indexing system 133 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A method for organizing a number of digital images, comprising the steps of:
   associating the number of digital images with a digital map in a computer system;
   geographically indexing each of the digital images on the digital map in the computer system by positioning an image icon on the digital map for each of the digital images, wherein each of the image icons is associated with a corresponding one of the digital images; and
   generating a graphical user interface that includes a display of the digital map with the image icons and a display of a thumbnail of a selected one of the images in a graphical user interface, the selected one of the images being associated with a highlighted one of the image icons in the digital map.

2. The method of claim 1, further comprising the step of transmitting the graphical user interface to a client for display on the client, wherein the computer system is a server.

3. The method of claim 1, wherein the step of geographically indexing each of the digital images on the digital map in the computer system further comprises the step of:
   obtaining a set of geographical coordinates associated with each of the digital images; and
   identifying a position on the digital map that represents the geographical coordinates for each of the digital images.

4. The method of claim 3, wherein the step of identifying a position on the digital map that represents the geographical coordinates for each of the digital images further comprises the step of locating each of the geographical locations associated with the respective digital images on a coordinate plane associated with the digital map.

5. The method of claim 1, further comprising the step of transmitting a digital image to a client in response to request received from the client, the request being generated upon a highlighting of the one of the image icons in the graphical user interface at the client.

6. A system in a server for organizing a number of digital images, comprising the steps of:
   a processor circuit having a processor and a memory;
   an indexing system stored on the memory and executable by the processor, the indexing system comprising:
      logic to associate the number of digital images with a digital map;
      logic to geographically index each of the digital images on the digital map by positioning an image icon on the digital map for each of the digital images, wherein each of the image icons is associated with a corresponding one of the digital images; and
      logic to generate a graphical user interface for transmission to a client, the graphical user interface including a display of the digital map with the image icons and a display of a thumbnail of a selected one of the images in a graphical user interface, the selected one of the images being associated with a highlighted one of the image icons in the digital map.

7. The system of claim 6, wherein the indexing system further comprises logic to transmit the graphical user interface to a client for display.

8. The system of claim 6, wherein the logic to geographically index each of the digital images on the digital map further comprises:
   logic to obtain a set of geographical coordinates associated with each of the digital images; and
   logic to identify a position on the digital map that represents the geographical coordinates for each of the digital images.

9. The system of claim 8, wherein the logic to identify the position on the digital map that represents the geographical coordinates for each of the digital images further comprises logic to locate each of the geographical coordinates associated with the respective digital images on a coordinate plane associated with the digital map.

10. The system of claim 6, further comprising logic to transmit the digital image to a client in response to request received from the client, the request being generated upon a highlighting of the one of the image icons in the graphical user interface at the client.

11. A system in a server for organizing a number of digital images, comprising the steps of:
    means for associating the number of digital images with a digital map; and
    means for geographically indexing each of the digital images on the digital map by positioning an image icon on the digital map for each of the digital images, wherein each of the image icons is associated with a corresponding one of the digital images; and
    means for generating a graphical user interface for transmission to a client, the graphical user interface including a display of the digital map with the image icons and a display of a thumbnail of a selected one of the images in a graphical user interface, the selected one of the images being associated with a highlighted one of the image icons in the digital map.

12. The system of claim 11, wherein the means for geographically indexing each of the digital images on the digital map further comprises:

means for obtaining a set of geographical coordinates associated with each of the digital images; and means for identifying a position on the digital map that represents the geographical coordinates for each of the digital images.

13. A method for indexing a number of digital images, comprising the steps of:

displaying a digital map of a geographical area on a display device of a computer system;

displaying a plurality of image icons generated by an indexing system on the digital map, each of the image icons being associated with a respective one of a plurality of digital images accessible by the computer system;

highlighting one of the image icons;

displaying a thumbnail of one of the digital images associated with the highlighted one of the image icons on the display device concurrently with the display of the digital map.

14. The method of claim 13, further comprising the step of:

providing a non-indexed digital image and a geographical location associated with the non-indexed digital image to the indexing system; and displaying a new image icon at a position on the digital map corresponding to the geographical location, the new image icon being generated by the indexing system.

15. The method of claim 14, wherein the step of providing the non-indexed digital image and the geographical location associated with the non-indexed digital image to the indexing system further comprises the step of downloading the non-indexed digital image and the geographical location from a memory.

16. The method of claim 13, wherein the step of displaying a thumbnail of one of the digital images further comprises the steps of:

generating a request for the digital image; and applying the request to the indexing system.

17. A method for indexing a number of digital images, comprising the steps of:

displaying a digital map of a geographical area on a display device of a computer system;

displaying an image icon generated by an indexing system on the digital map, the image icon being associated with a digital image accessible by the computer system;

displaying the digital image upon a manipulation of the image icon;

providing a non-indexed digital image and a geographical location associated with the non-indexed digital image to the indexing system;

displaying a new image icon at a position on the digital map corresponding to the geographical location, the new image icon being generated by the indexing system; and wherein the step of providing the non-indexed digital image and the geographical location associated with the non-indexed digital image to the indexing system further comprises the step of pinpointing the geographical location on the digital map displayed on the display device of the computer system.

* * * * *